United States Patent
Teague

(10) Patent No.: US 11,542,808 B2
(45) Date of Patent: Jan. 3, 2023

(54) METHODS AND MEANS FOR DETERMINING THE EXISTENCE OF CEMENT DEBONDING WITHIN A CASED BOREHOLE USING X-RAY TECHNIQUES

(71) Applicant: Philip Teague, Houston, TX (US)

(72) Inventor: Philip Teague, Houston, TX (US)

(73) Assignee: Visuray Intech Ltd (BVI), Tortola (VG)

( * ) Notice: Subject to any disclaimer, the term of this patent is extended or adjusted under 35 U.S.C. 154(b) by 1050 days.

(21) Appl. No.: 16/168,280

(22) Filed: Oct. 23, 2018

(65) Prior Publication Data
US 2019/0063209 A1  Feb. 28, 2019

Related U.S. Application Data

(60) Provisional application No. 62/575,747, filed on Oct. 23, 2017.

(51) Int. Cl.
*G01V 5/04* (2006.01)
*E21B 47/005* (2012.01)
(Continued)

(52) U.S. Cl.
CPC .......... *E21B 47/005* (2020.05); *E21B 47/002* (2020.05); *G01N 9/24* (2013.01); *G01N 23/203* (2013.01); *G01V 5/12* (2013.01)

(58) Field of Classification Search
CPC ....... E21B 47/005; E21B 47/002; G01N 9/24; G01N 23/203; G01V 5/12
See application file for complete search history.

(56) References Cited

U.S. PATENT DOCUMENTS

| 3,564,251 A | 2/1971 | Youmans |
| 8,138,471 B1 | 3/2012 | Shedlock et al. |

(Continued)

FOREIGN PATENT DOCUMENTS

| GB | 2497857 A | 6/2013 | |
| WO | WO-2016076920 A2 * | 5/2016 | ........... G01T 1/1648 |
| WO | 2016/153523 A1 | 9/2016 | |

OTHER PUBLICATIONS

Notification of Transmittal of the International Search Report and the Written Opinion of the International Searching Authority, or the Declaration issued in the corresponding PCT International Application No. PCT/US2018/057079, dated Feb. 1, 2019 (13 pages).

(Continued)

*Primary Examiner* — Kiho Kim
(74) *Attorney, Agent, or Firm* — Adams and Reese LLP; Ray R. Ferrera

(57) ABSTRACT

An x-ray-based cement evaluation tool for determining whether a cement bond exists between the casing and cement of a cemented borehole is provided, the tool including at least: an internal length comprising a sonde section, wherein said sonde section further comprises an x-ray source; a radiation shield for radiation measuring detectors; arrayed pixelated detectors; sonde-dependent electronics; and a plurality of tool logic electronics and PSUs. A method of using an x-ray-based cement evaluation tool for measuring a cement bond between a casing and the cement of a cemented borehole is also provided, the method including: producing x-ray in a conical beam to illuminate a well casing; measurement of the returning photons as a function of radial and axial offset; remapping the intensity of returning photons to a geometric response within the casing and cement; and determining whether an annulus is present between the casing and cement.

13 Claims, 4 Drawing Sheets

(51) Int. Cl.
*G01N 23/203* (2006.01)
*G01N 9/24* (2006.01)
*G01V 5/12* (2006.01)
*E21B 47/002* (2012.01)

(56) References Cited

U.S. PATENT DOCUMENTS

| | | | |
|---|---|---|---|
| 2006/0102345 A1* | 5/2006 | McCarthy | E21B 43/267 |
| | | | 166/250.1 |
| 2008/0061225 A1 | 3/2008 | Orban et al. | |
| 2017/0248733 A1 | 8/2017 | Hu et al. | |
| 2018/0231680 A1* | 8/2018 | Hirabayashi | G01V 1/366 |

OTHER PUBLICATIONS

Examination Report No. 2 for standard patent application in corresponding AU patent application No. 2018355216; dated May 6, 2021.

* cited by examiner

METHODS AND MEANS FOR DETERMINING THE EXISTENCE OF CEMENT DEBONDING WITHIN A CASED BOREHOLE USING X-RAY TECHNIQUES

TECHNICAL FIELD

The present invention relates generally to methods and means for determining whether a cement bond exists between the casing and cement of a cemented borehole, and in a particular though non-limiting embodiment to a system using x-ray backscatter measurements in a package that does not require direct physical contact with the well casings (i.e., non-padded).

BACKGROUND

Within the oil & gas industry, the requirement to gauge the quality of cement through well casing is paramount as is the ability to determine the status of the annuli. The industry currently employs various methods for the verification of the hydraulic seal behind a single casing string. Typically, ultra-sonic tools are run within the well to determine whether cement is bonded to the outside of the casing, thereby indicating the presence of cement in the annulus between the casing and formation, or between the casing and an outer casing. Ultimately, a leak-off (pressure) test is required to ensure that zonal isolation has been achieved as Ultrasonic tools are highly dependent upon quality of the casing, the bond between the casing and the material in the annulus, and the mechanical properties of the material in the annulus to be able to work correctly. In addition, ultrasonic tools treat the material in the annulus as a single isotropic and homogenous volume, any actual deviation away from this ideal leads to inaccuracies in the measurement.

Typically, a micro-annulus is defined as being a gap between the casing and cement of 30 micrometers or more (i.e. 0.03 mm)

Current tools can offer information regarding the cement bond of the inner-most casing, yet do not have the ability to discriminate various depths into the cement or annular material. This can lead to the possibility that fluid-migration paths may exist at the cement-formation boundary, within the cement itself, or between the casing and an outer casing, thereby leading to a loss of zonal isolation.

Further, x-ray-based techniques that are designed to produce a three dimensional voxelated map of the cement in the cement annuli but are unable to determine whether a micro-annulus exists. Typically, acoustic/ultra-sound tools need to be run within the same tool-string as the x-ray tool, such that the acoustic/ultra-sound tools inspect the cement bond, and x-ray tools inspect the cement mass.

No viable x-ray technologies are currently available which are able to determine whether a delamination or micro-annulus exists.

Prior art teaches a variety of techniques that use x-rays or other radiant energy to inspect or obtain information about the structures within or surrounding the borehole of a water, oil or gas well, yet none teach of a method or means to compare the anticipated density profile around the casing-cement interface to the measured interface profile.

US20180180765 to Teague et al teaches of a method and means to use a pseudo-conical x-ray beam, located within a non-padded concentrically-located borehole logging tool, for the purpose of detecting density variations within the annular materials surrounding a borehole within single or multi-string cased-hole environments. The arrangement of the collimated detectors permits the collection of data that relates specifically to known azimuthal and radially located regions of interaction (azimuthally distributed depths of investigation).

US20180188411 to Teague et al teaches of a method and means to use employ an actuated combination of collimators, located cylindrically around an X-ray source, located within a non-padded concentrically-located borehole logging tool, for the purpose of detecting density variations within the annular materials surrounding a borehole within single or multi-string cased-hole environments. It also teaches of the capability to actuate collimators, switching between a fixed collimator mode, that provides the output of an azimuthal array of a plurality of x-ray beams (from said x-ray source), or to select through actuation, a mode that produces a single or plurality of individual azimuthally arranged x-ray beams that 'scan' azimuthally, through the rotation of one of the collimators. In addition, it teaches of the opportunity to select a mode that permits the selection of a non-rotating mode but actuates a collimated sleeve the switches between various angles or declinations of x-ray beam outputs (compared to the major axis of the tool).

U.S. Pat. No. 7,675,029 to Teague et al teaches concepts for an apparatus that permits the measurement of x-ray backscattered photons from any horizontal surface inside of a borehole that refers to two-dimensional imaging techniques.

U.S. Pat. No. 8,481,919 to Teague teaches of a method of producing Compton-spectrum radiation in a borehole without the use of radioactive isotopes, and further describes rotating collimators around a fixed source installed internally to the apparatus but does not have solid-state detectors with collimators. It further teaches of the use of conical and radially symmetrical anode arrangements to permit the production of panoramic x-ray radiation.

U.S. Pat. No. 7,705,294 to Teague teaches a concept for an apparatus that aims to measure backscattered x-rays from the inner layers of a borehole in selected radial directions with the missing segment data being populated through movement of the apparatus through the borehole. The apparatus permits generation of data for a two-dimensional reconstruction of the well or borehole, but the publication does not teach of the necessary geometry for the illuminating x-ray beam to permit discrimination of the depth from which the backscattered photons originated, only their direction.

U.S. Pat. No. 3,564,251 to Youmans discloses of the use of a azimuthally scanning collimated x-ray beam that is used to produce an attenuated signal at a detector for the purposes of producing a spiral-formed log of the inside of a casing or borehole surface immediately surrounding the tool, effectively embodied as an x-ray caliper.

U.S. Pat. No. 7,634,059 to Wraight discloses a concept and apparatus that may be used to measure two-dimensional x-ray images of the inner surface inside of a borehole without the technical possibility to look inside of the borehole in a radial direction.

US2013/0009049 to Smaardyk discloses the concept for an apparatus that allows measurement of backscattered x-rays from the inner layers of a borehole.

U.S. Pat. No. 8,138,471 to Shedlock discloses a concept for a scanning-beam apparatus based on an x-ray source, a rotatable x-ray beam collimator and solid-state radiation detectors enabling the imaging of only the inner surfaces of borehole casings and pipelines.

U.S. Pat. No. 5,326,970 to Bayless discloses a concept for a tool that aims to measure backscattered x-rays from inner surfaces of a borehole casing with the x-ray source being based on a linear accelerator.

U.S. Pat. No. 5,081,611 to Hornby discloses a method of back projection to determine acoustic physical parameters of the earth formation longitudinally along the borehole using a single ultrasonic transducer and a number of receivers, which are distributed along the primary axis of the tool.

U.S. Pat. No. 6,725,161 to Hillis discloses of a method of placing a transmitter in a borehole, and a receiver on the surface of the earth, or a receiver in a borehole and a transmitter on the surface of the earth, with the aim to determine structural information regarding the geological materials between the transmitter and receiver.

U.S. Pat. No. 6,876,721 to Siddiqui discloses a method to correlate information taken from a core-sample with information from a borehole density log. The core-sample information is derived from a CT scan of the core-sample, whereby the x-ray source and detectors are located on the outside of the sample, and thereby configured as an outside-looking-in arrangement. Various kinds of information from the CT scan such as its bulk density is compared to and correlated with the log information.

U.S. Pat. No. 4,464,569 to Flaum discloses a method to determine the elemental composition of earth formations surrounding a well borehole by processing the detected neutron capture gamma radiation emanating from the earth formation after neutron irradiation of the earth formation by a neutron spectroscopy logging tool.

U.S. Pat. No. 4,433,240 Seeman to discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records the backscattered radiation from the formation surrounding the borehole by means of a pulsed electromagnetic energy or photon source, so that characteristic information may be represented in an intensity versus depth plot format.

U.S. Pat. No. 8,664,587 to Evans et al discloses a method and means for creating azimuthal neutron porosity images in a logging while drilling environment. As bottom hole assembly based systems historically relied upon the rotation of the drill string to assist in the acquisition of azimuthally dependent data, the patent discusses an arrangement of azimuthally static detectors which could be implemented in a modern BHA which does not necessarily rotate with the bit, by subdividing the neutron detectors into a plurality of azimuthally arranged detectors which are shielded within a moderator to infer directionality to incident neutrons and gamma.

U.S. Pat. No. 9,012,836 to Wilson et al discloses a method and means for creating azimuthal neutron porosity images in a wireline environment. In much similarity to U.S. Pat. No. 8,664,587 the patent discusses an arrangement of azimuthally static detectors which could be implemented in a wireline tool to assist an operator in interpreting logs post-fracking, by subdividing the neutron detectors into a plurality of azimuthally arranged detectors which are shielded within a moderator to infer directionality to incident neutrons and gamma.

U.S. Pat. No. 4,883,956 to Manente et al discloses an apparatus and methods for investigation of subsurface earth formations, using an apparatus adapted for movement through a borehole. Depending upon the formation characteristic or characteristics to be measured, the apparatus may include a natural or artificial radiation source for irradiating the formations with penetrating radiation such as gamma rays, x-rays or neutrons. The light produced by a scintillator in response to detected radiation is used to generate a signal representative of at least one characteristic of the radiation and this signal is recorded.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rugosity and/or lithology.

U.S. Pat. No. 3,321,627 to Tittle discloses of a method, and means of practice of a system of collimated detectors and collimated gamma-ray sources to determine the density of a formation outside of a borehole, to be represented in a density versus depth plot format. However, fails to teach of a means or method to achieve such through the steel wall of a single or multiple well casings.

SUMMARY

An x-ray-based cement evaluation tool for determining whether a cement bond exists between the casing and cement of a cemented borehole is provided, the tool including at least: an internal length comprising a sonde section, wherein said sonde section further comprises an x-ray source; a radiation shield for radiation measuring detectors; arrayed pixelated detectors; per pixel parallel-hole collimators; sonde-dependent electronics; and a plurality of tool logic electronics and PSUs.

A method of using an x-ray-based cement evaluation tool to measure a cement bond between a casing and the cement of a cemented borehole, said method comprising: producing x-rays in a conical beam to illuminate a well casing; measuring returning photons as a function of radial and axial offset; remapping the intensity of returning photons to a geometric response within the casing and cement; and determining whether an annulus is present between the casing and cement.

BRIEF DESCRIPTION OF SEVERAL EXAMPLE EMBODIMENTS

The present invention described herein consists of a method and means to use parallel-hole collimators located axially offset from the output of an X-ray source within a non-padded concentrically-located borehole logging tool, together with a single or plurality of two dimensional per-pixel collimated imaging detector array(s) that may also be used as the primary fluid/offset compensation detectors.

In one example embodiment, an x-ray-based cement evaluation logging tool [101] is deployed by wireline conveyance [104] into a cased borehole [102], wherein the density of materials surrounding the borehole [103] are measured by the tool. The tool is enclosed by a pressure housing which ensures that well fluids are maintained outside the housing.

Figure 1:
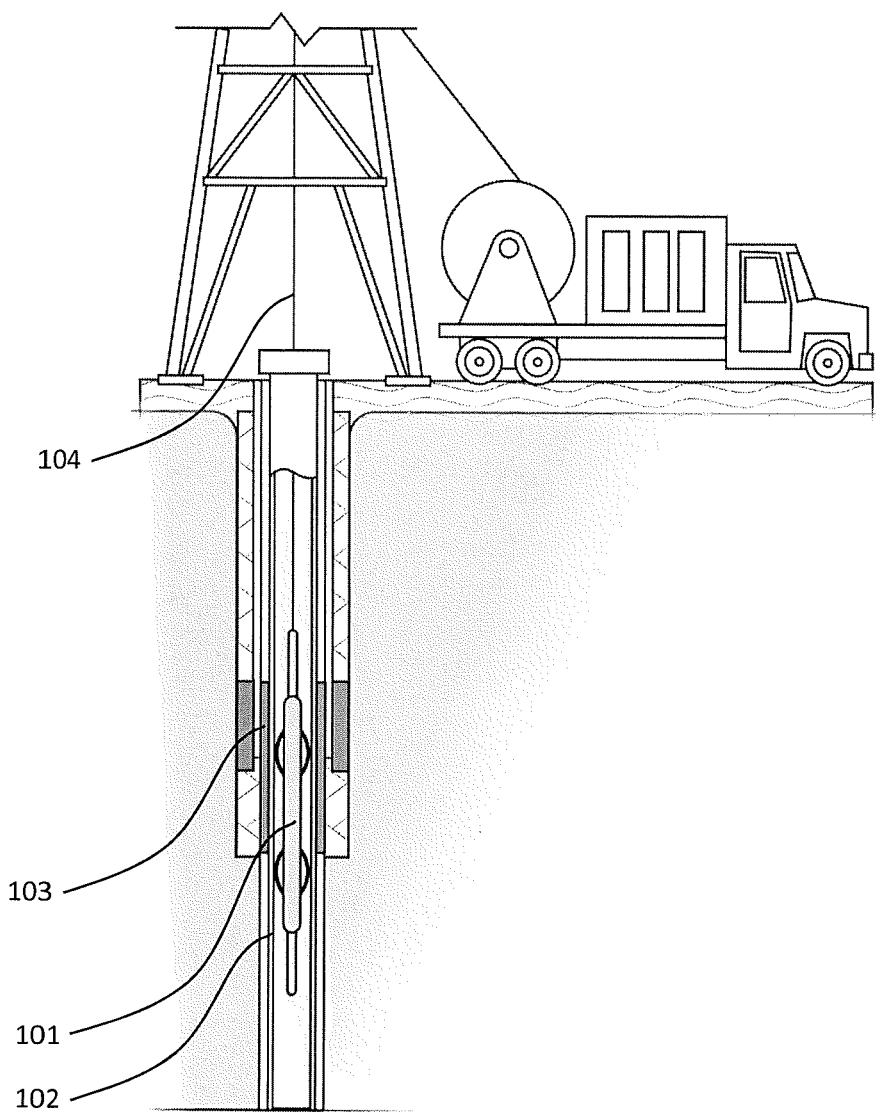
FIG. 1 illustrates an x-ray-based cement evaluation tool being deployed into a borehole via wireline conveyance. Regions of interest within the materials surrounding the borehole are also indicated.
Figure 2:
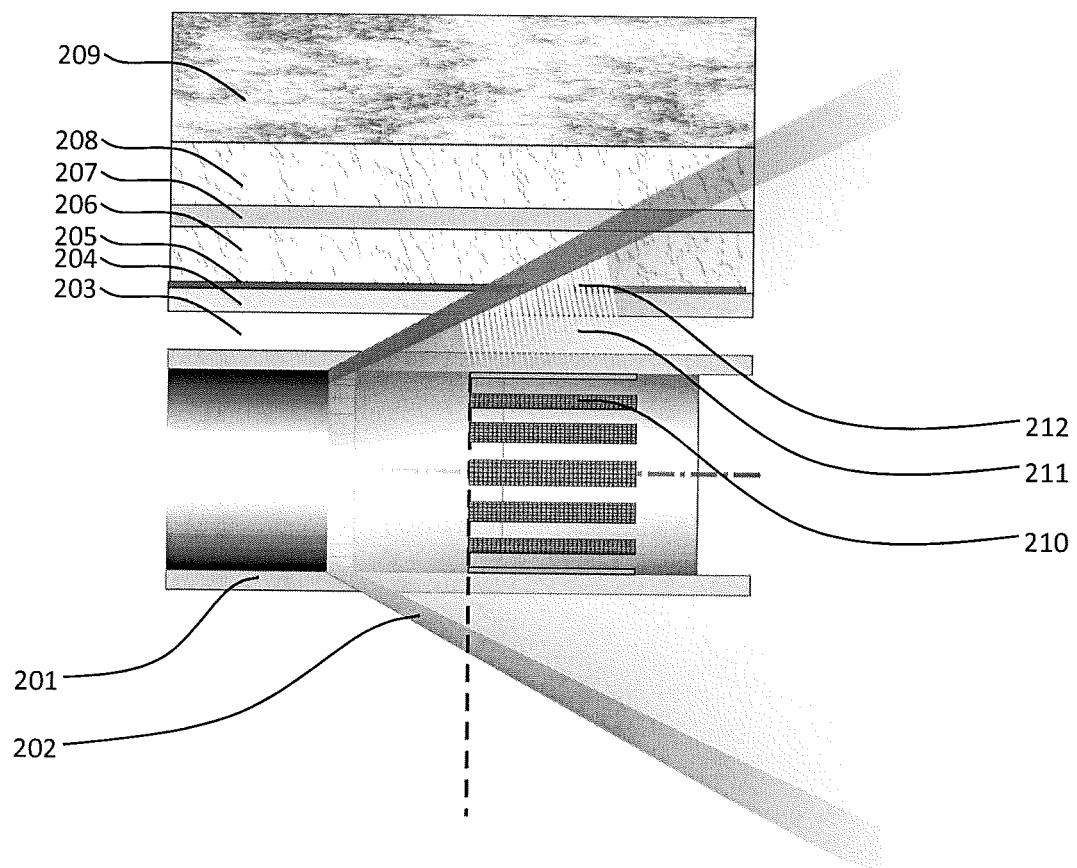
FIG. 2 illustrates one example of an x-ray-based cement evaluation tool using a conical x-ray beam to interrogate the interface between the outer diameter of a casing and the inner diameter of the corresponding cement.
Figure 3:
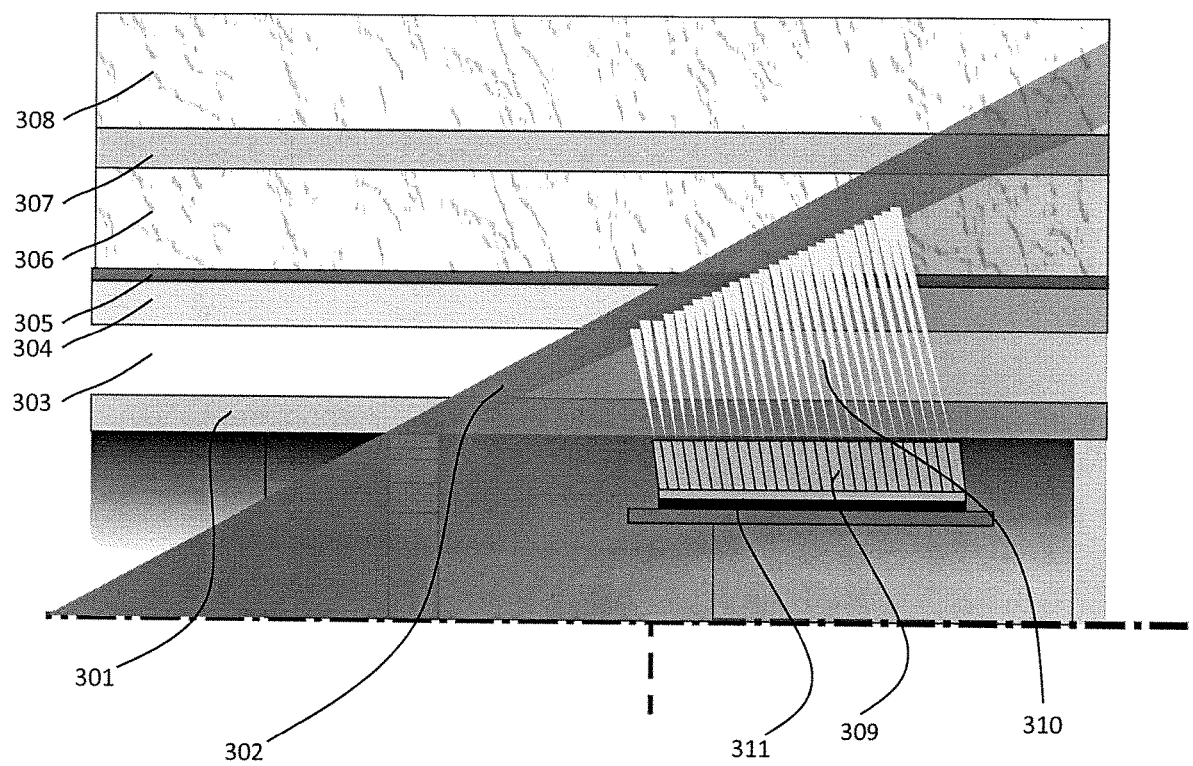
FIG. 3 illustrates one example of an x-ray-based cement evaluation tool using a conical x-ray beam to interrogate the interface between the outer diameter of a casing and the inner diameter of the corresponding cement, further illustrating how per-pixel collimation may be used to quantitatively segment the imaged region along the beam path of the x-ray.
Figure 4:
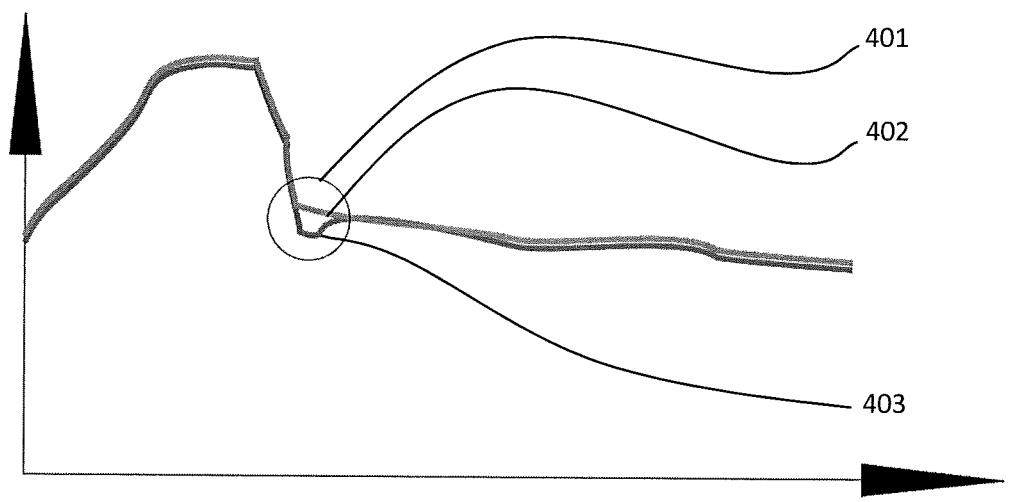
FIG. 4 illustrates an anticipated resultant plot of intensity (vertical axis) versus axial offset (horizontal axis) and the discrepancy in intensity between a well-bonded cement-casing interface and a poorly bonded cement-casing interface.

FIG. 2 illustrates an example embodiment of a conical/panoramic output x-ray source disposed within a pressure housing [201]. The form of the output x-ray beam [202] is projected at an angle to the primary axis of the tool housing [201] and well casings [204, 207] such that the primary beam intersects with the wellbore fluid annulus surrounding the tool [203], the first casing [204], the interfacial region between the casing and cement [205], the first annulus of cement [206], and if present, additional casings [207] and cement annulus [208], and finally the formation. As the x-ray beam [202] interacts with the media surrounding the borehole, the counts that are detected at each axially offset detector/pixel within the array is a convolution of the various attenuation factor summations of the detected photons as they travelled through and back through each 'layer' of the borehole surroundings. As the detector is a per-pixel collimated imaging detector array, the detectors are also capable of creating backscatter images of the casing itself. When the tool is actuated axially (through conveyance) the images, collected as a function of axial offset/depth, can be tessellated to produce long two-dimensional x-ray backscatter images of the casing and surrounding materials. The backscatter images may also contain spectral information, such that a photo-electric or characteristic-energy measurement can be taken, such that the imaged material may be analyzed for scale-build up or corrosion etc. As the source beam [302] is positioned at an angle to the primary axis of the tool housing [301] and well casings [304, 307], the field of view of each collimator [310] accompanying each detector/detector-pixel in the array of detectors/detector-pixels [311] will be able to collect photons that correspond to the varying depths of investigation along the beam-path of the incident x-ray beam. As such, for each detector/detector-pixel of increasing offset axially from the source-outlet, the corresponding depth of investigation increases.

In another embodiment, the counts collected within each array of detectors/detector-pixels [309] are used to compute density as a function of radial distance (away from the tool) and axial distance (as the tool is conveyed through the borehole).

When plotting computed density as a function of radial distance (from the outer diameter of the tool), a micro-annulus located at the cement-casing interface [305] would create a very slight reduction in attenuation as the primary x-ray beam and returning scattered radiation (from the volumetric region) passes back through the interface region. The effect of such a localized reduction in attenuation has an effect on the counts received by the detectors arranged to interrogate this specific interface. For example, the effect is distinguishable [401] compared to the density of the nearby cement, such that the plot demonstrating the presence of delamination or a micro-annulus [403] exhibits a small reduction in density as compared to no delamination [402]. Any dip in the computed density of the region between the casing and cement is indicative of a low-density region as compared to the cement, which indicates a gap or delamination.

In another embodiment, the collimators used to give directionality to the output of an x-ray source comprise square formed tubes within a shielding material. In a further embodiment, the collimators used to give directionality to the output of an x-ray source comprise rectangular formed tubes within a shielding material.

In yet another embodiment, the output from each pixel is summated as a function of depth to provide tool offset (eccentricity) data, which acts as a key-input into the fluid compensation of the detectors that possess a larger axial offset (cement evaluation detectors), and hence, a deeper depth of investigation into the materials surrounding the borehole.

In a further embodiment, the x-ray beam interacts with the media surrounding the borehole, and the counts detected at each axially offset group of detectors comprise a convolution of the various attenuation factor summations of the detected photons as they travel through and back through each 'layer' of the borehole surroundings. The data collected by each detector may be deconvoluted through the use of the data collected by the detector array, to compensate for fluid-thickness and casing variations alone. As the detector is a per-pixel collimated imaging detector array, the detectors are also capable of creating backscatter images of the casing itself. When the tool is actuated axially (through wireline logging) the images, collected as a function of axial offset/depth, can be tessellated to produce long two-dimensional x-ray backscatter images of the casing.

In another embodiment, the backscatter images also contain spectral information, such that a photo-electric or characteristic-energy measurement may be taken, and such that the imaged material may be analyzed for scale-build up or casing corrosion, etc.

In a further embodiment, machine learning is employed to automatically analyze the spectral (photo electric or characteristic energy) content of the logged data and identify key features, such as corrosion, holes, cracks, scratches, and/or scale-buildup.

In a further embodiment, machine learning is employed to automatically analyze the interface between the casing and cement to automatically highlight regions of the well that appear to exhibit an issue with micro-annuli or delamination.

In another embodiment, the rotation of the collimator permits an increase of the discrete resolving power of the azimuthal location of density variations in the annular materials surrounding the wellbore in multi-string cased-hole environments. An axial plurality of fixed collimated detector-sets is used to measure the multiple-scatter signal resulting from the interaction of the beam with the casing and annular materials. The collimator sleeves may be actuated to enable the selection of varying x-ray beam output modes. The upper section shows an example of an arrangement producing a non-rotating plurality of azimuthally located x-ray beams, wherein each beam is accompanied by an axially-paired two dimensional per-pixel collimated imaging detector array. The lower section illustrates how the axial actuation of one sleeve and the rotation of another, can produce a single or multi-element azimuthally rotating beam (lighthouse). The azimuthal plurality of detectors would rotate with the source collimation sleeve, around the major axis of the tool, such that the result would be a 'multi-helical' ribbon log of the detector array, that can be re-formatted to create a complete image of the 360 degrees of the casing as a function of depth/axial and radial distance, the result being a 360 degree log of cement bond integrity as a function of axial depth.

In a further embodiment, the per-pixel collimated imaging detector array comprises a single 'strip' array (i.e., one pixel wide and multiple pixels long)—the imaging result being a 'helical' ribbon image, that can be re-formatted to create a complete density log of the 360 degrees of the casing as a function of depth/axial and radial-distance.

In a further embodiment, the means is combined with other x-ray cement inspection techniques to enable the cement-bond and entire cement mass to be interrogated and analyzed by a single tool within a single pass.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray-based cement evaluation tool for determining whether a cement bond exists between the casing and cement of a cemented borehole, and wherein said tool comprises:
    an internal length comprising a sonde section, wherein said sonde section further comprises an x-ray source;
    a radiation shield for radiation measuring detectors;
    arrayed pixelated detectors;
    per pixel parallel-hole collimators;
    sonde-dependent electronics;
    and a plurality of tool logic electronics and; power supply units,
    wherein the detected intensity of returning photons is delineated axially through the use of parallel hole collimators, such that the difference between a bonded cement region or non-bonded cement region is determined.

2. The tool of claim 1, wherein said shield further comprises tungsten.

3. The tool of claim 1, wherein the collimators used to give directionality to the output said x-ray source are square formed tubes within a shielding material.

4. The tool of claim 1, wherein the output from each pixel is summated as a function of depth to provide tool stand-off data.

5. The tool of claim 1, wherein the tool is configured so as to permit through-wiring.

6. The tool in claim 1, wherein the tool is integrated into a logging-while-drilling assembly.

7. The tool in claim 1, wherein the tool is powered by mud-turbine generators.

8. The tool in claim 1, wherein the tool is powered by batteries.

9. A method of using an x-ray-based cement evaluation tool to measure a cement bond between a casing and the cement of a cemented borehole, said method comprising:
    producing x-rays in a conical beam to illuminate a well casing;
    measuring returning photons as a function of radial and axial offset;
    remapping the intensity of returning photons to a geometric response within the casing and cement; and
    determining whether an annulus is present between the casing and cement.

10. The method of claim 9, further comprising delineating the detected intensity of returning photons axially through the use of parallel hole collimators, such that the difference between a bonded cement region or non-bonded cement region is determined.

11. The method of claim 9, further comprising using a shield further comprising tungsten.

12. The method of claim 9, further comprising using collimators to give directionality to the output said x-ray source comprising square formed tubes within a shielding material.

13. The method of claim 9, further comprising summating the output from each pixel as a function of depth to provide tool stand-off data.

* * * * *